2,035,118

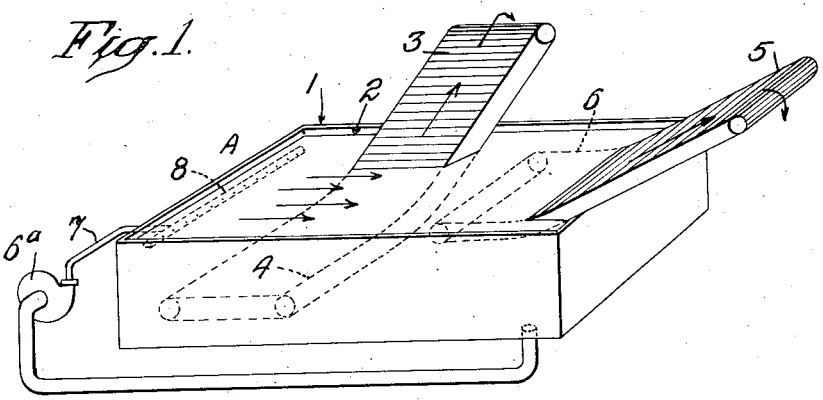
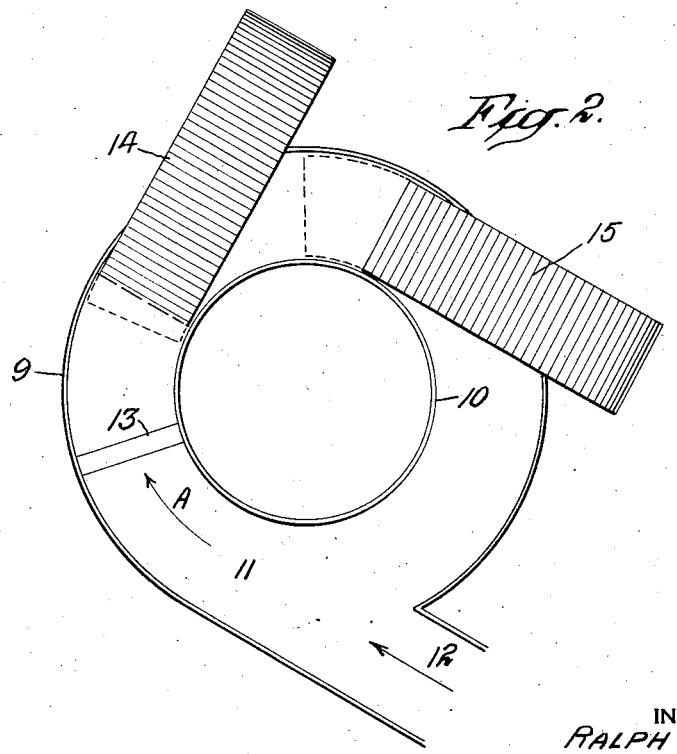

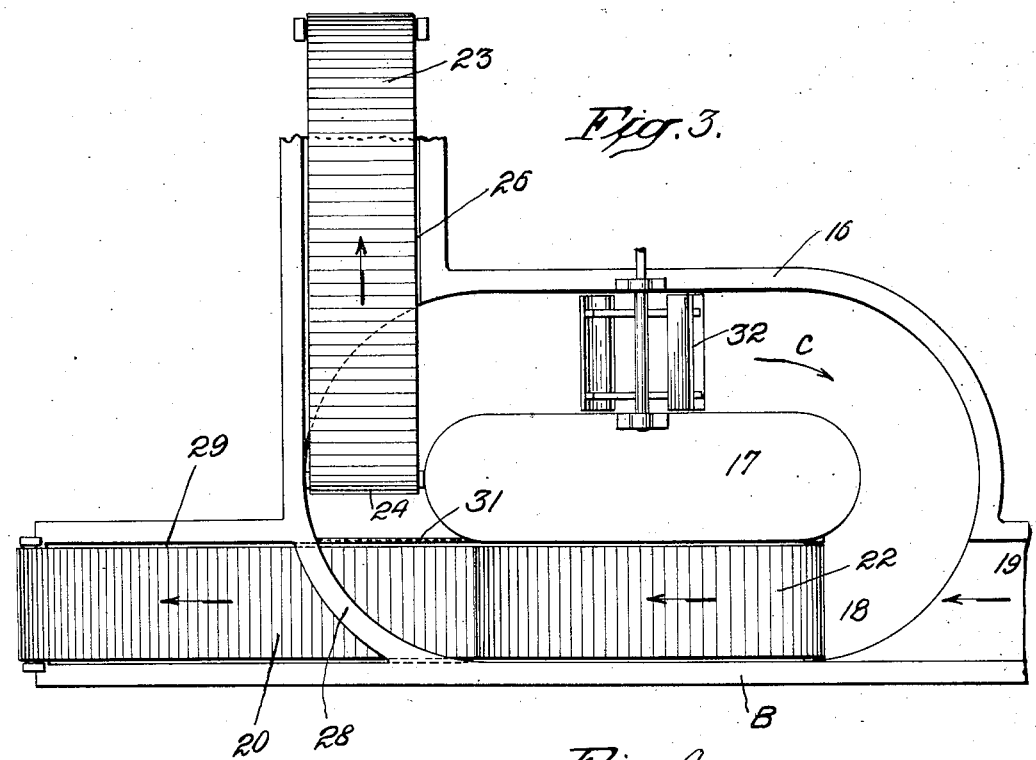
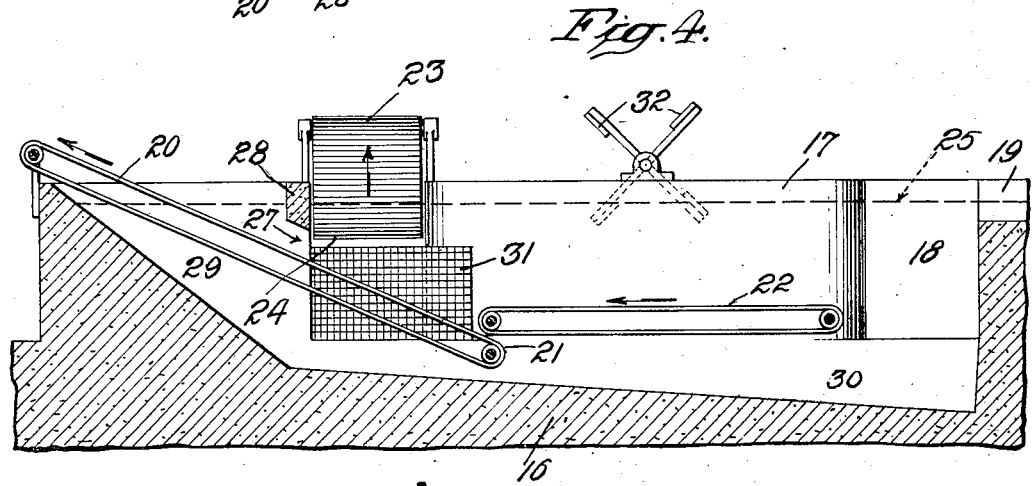
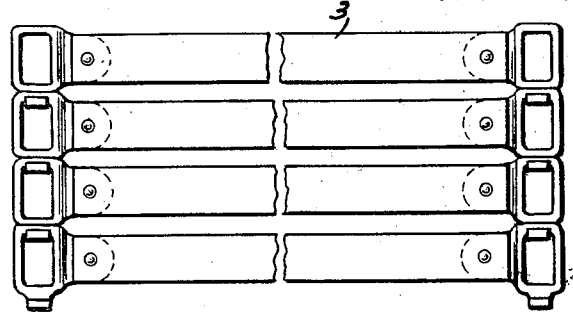
INVENTOR
RALPH S. FALKINER
BY
E. C. Sanborn
ATTORNEY Patented Mar. 24, 1936

UNITED STATES PATENT OFFICE 2,035,118

HARVESTING AND TREATMENT OF SUGAR CANE

Ralph Sadleir Falkiner, Melbourne, Victoria, Australia

Application November 12, 1932, Serial No. 642,348
In Great Britain March 26, 1928

6 Claims. (Cl. 209—173)

This invention relates to the harvesting and treatment of sugar cane and has for its object to provide improved means whereby sugar cane is more efficiently cleansed of unprofitable matter before introduced into the mill.

According to the invention the cane, tops, leaves and trash are cut or chopped into small pieces and are then passed into a bath of water, whereby, owing to the difference in specific gravities, the good or sweet cane sinks, the tops, leaves, dead and sour stalks and other trash float on the surface of the water and are thereby separated from the good cane. Suitable means may be employed for automatically removing the good cane and also the separated sour stalks, tops and trash from the bath as hereinafter described.

To enable the invention to be fully understood it will now be described by reference to the accompanying drawings in which:—

Fig. 1 is a perspective view of one form of apparatus suitable for carrying out the invention, and Fig. 2 is a plan view of a further form of apparatus.

Fig. 3 is a plan view of another form of apparatus.

Fig. 4 is a vertical longitudinal sectional view of the apparatus shown in Fig. 3.

Fig. 5 is a fragmentary detail view of a form of belt which may be employed in the practice of my invention.

Referring first to Fig. 1, a tank 1, is filled with water, the level being indicated at 2. An endless moving conveyor 3 is mounted with one end 4 at or adjacent to the bottom of the tank and a second conveyor 5 is mounted with one end 6 just below the surface of the water. These conveyors move in the direction of the arrows and are of any suitable construction and may be driven by any suitable means. Each may consist of an endless belt, passing over rollers or the like at its ends. The belt may consist of a series of slats with spaces between to allow drainage of the water, such as shown by way of example in Fig. 5, or any equivalent construction may be employed.

A pump 6a is provided for circulating the water in the tank through the pipe 7 and through a perforated pipe 8 arranged along the side of the tank opposite to the conveyor 5 and below the surface of the water.

With the above described arrangement, the cut cane is passed into the tank over the side A for example. The good cane falls to the bottom and is removed by the conveyor 3. The sour stalks and trash float on the surface and the circulation current of the water induced by the pipe 8 tends to force this floating material on to the conveyor 5 which removes it. The good cane is taken into the mill and the trash dealt with as desired.

Referring now to Fig. 2. A preferably circular pit or tank 9 is provided having a solid central portion 10 which serves to form a circular channel 11 for the passage of water.

A stream of water is caused to flow into the channel 11 through the inlet 12 and circulates round the apparatus in the direction of the arrow A. A skimmer 13 is provided as shown and behind same and extending to a point just below the surface of the water is conveyor 14 similar to the conveyor 5 (Fig. 1). This conveyor extends preferably across the full width of the channel. On the other side of the channel a conveyor 15 for the good cane and similar to the conveyor 6 (Fig. 1) is provided. This conveyor extends to the bottom of the channel and preferably over the full width thereof. In this arrangement the cut cane, tops, leaves and trash are thrown into the channel in front of the skimmer and the water current carries the floating material to the trash conveyor 14, the good cane falling to the bottom of the channel and being carried round to the conveyor 15 which removes it.

Any suitable means may be employed for circulating the water in the channel and the apparatus is provided with a suitable outlet or overflow. A pumping system may be connected to the channel in such a manner that the same water is circulated continuously through the channel. This method is of advantage in cases where only a limited water supply is available.

With this invention all the good cane is washed before being milled, thus removing grit which tends to damage the rollers of the mill and all extraneous matter is removed, thus facilitating the filtration and clarification of the juices.

All leaves, tops and trash are removed. Under present conditions, the percentage of these which go into the mill do so without any sugar content and leave it as (bagass) with an appreciable amount of unrecoverable sugar.

The elimination of sour cane from the mill is a decided advantage in the manufacture of sugar from a "stand over" crop.

A sump or the like may be provided at or near the bottom of the tank for the reception of dirt and earthy matter removed from the cane by the washing action of the water. This deposit may be removed continuously or at intervals by any suitable means such as a suction pump or the like. The water may be agitated if desired to assist the separation.

In Figures 3 and 4 there is shown an elongated pit or tank 16, the central portion 17 of which is solid and provides a channel 18 for the passage of water. A stream of water is caused to flow into the channel 18 through the inlet 19. An endless moving conveyor 20 extends at one end 21 to a point adjacent the bottom of the tank and is positioned for receiving cane from another endless moving conveyor 22 mounted near the bottom of said tank. An endless moving conveyor 23 extends at its end 24 to a point slightly below the water level 25. The outlet for the water may conveniently be formed by the channel 26 located beneath the conveyor 23. Conveyor 20, as shown, extends through an opening 27 through the end wall 28 of the pit and into an extension 29 of the pit, in communication with the channel 18. Said opening 27, as shown, is below the water level 25.

It will be seen that when the cut cane, leaves, tops, and trash are dumped into the channel 18 at the side B thereof the pieces of good cane sink in the water and are received by the conveyor 22, from which they are passed to conveyor 20 and thereby removed from the pit or tank. The arrows shown above the conveyors in Figures 3 and 4 indicate the direction of travel of the respective conveyors; the arrow above the conveyor 22 also indicating the direction of flow of the water in this portion of the pit. The water may be forced through the inlet 19 by any suitable pump or pressure source. The tops, leaves, trash and pieces of sour cane rise to the top of the water and are carried to the conveyor 23, by which they are removed from the pit.

The end wall 28 of the pit blocks the lighter material consisting of the tops, leaves, trash, and sour cane from passing on to the conveyor 20 and compels said lighter material to be carried by the current of water to the trash removing conveyor 23.

A sump 30 is provided beneath the conveyors 20 and 22, and sloping away therefrom as shown. Any dirt will tend to accumulate at the deep end of said sump, from which it can be pumped or otherwise removed.

By virtue of the curved wall 28, any scum or floating material escaping from the conveyor 23, which is preferably made of open link material, will be trapped and again directed to said conveyor instead of becoming lodged upon the cane on the conveyor 20.

A grating or grid 31 may be extended across the channel 18 in the position shown to prevent the cane from being washed off the carrier 20 as the latter approaches the opening 27 and as the water sweeps across it at the curved end of the bath.

If desired, a series of paddles 32, driven by any suitable means, may be inserted into the channel 18 between the conveyor 23 and inlet 19 to induce a flow of water in the direction of the arrow c. By said paddle there is induced an even movement of the water over the entire width of the bath on the surface, whereby skimming of the floating material by the conveyor 23 is facilitated.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

The present application is a continuation in part of my application for United States Letters Patent filed March 1, 1929, Serial No. 343,818.

I claim:

1. Apparatus for cleansing sugar cane prior to the extraction of juice therefrom, comprising an endless water channel for the reception of cut pieces of cane and trash, a conveyor extending substantially the full width of said channel to a point just below the surface of the water for removing material floating on said surface, a conveyor extending substantially the full width of said channel to a point adjacent the bottom thereof for removing the pieces of good cane, and means for causing the water in said channel to flow past said conveyors in directions transverse to the longitudinal axes thereof.

2. In apparatus for cleansing sugar cane prior to the extraction of juice therefrom, comprising an endless water channel for the reception of cane and trash, a conveyor extending substantially the full width of said channel to a point just below the surface of the water for removing material floating on said surface, a conveyor extending substantially the full width of said channel to a point adjacent the bottom thereof, means for causing the water in said channel to flow first past the second mentioned conveyor and then past the first mentioned conveyor, and means comprising a curved end wall for directing water carrying the floating material past the second mentioned conveyor and on to the first mentioned conveyor.

3. In apparatus for cleansing sugar cane prior to the extraction of juice therefrom, comprising an endless water channel for the reception of cane and trash, a conveyor extending substantially the full width of said channel to a point just below the surface of the water for removing material floating on said surface, a conveyor extending substantially the full width of said channel to a point adjacent the bottom thereof, means for causing the water in said channel to flow first past the second mentioned conveyor and then past the first mentioned conveyor, and means comprising a curved end wall for directing water carrying the floating material past the second mentioned conveyor and on to the first mentioned conveyor, said second mentioned conveyor passing beneath said curved wall to a point outside said channel.

4. Apparatus for cleansing sugar cane prior to the extraction of juice therefrom, comprising an endless water channel for the reception of cut pieces of cane and trash, said channel having an elongated intermediate portion and a curved end portion, conveyor means extending in said elongated portion and positioned near the bottom of said channel for receiving the pieces of good cane, said conveyor means continuing beneath the water level through an opening in said end portion and terminating at a point outside the channel and above the water level, and conveyor means in said curved end portion and extending to a point just below the surface of the water for removing material floating on said surface, said end portion being adapted to block floating material from passing on to the first mentioned conveyor and being also so constructed and arranged as to compel said floating material to be carried on to the second mentioned conveyor by the water in said channel.

5. Apparatus for cleansing sugar cane prior to the extraction of juice therefrom, comprising an endless water channel for the reception of cut pieces of cane and trash, said channel having an elongated intermediate portion and a curved end portion, conveyor means extending in said elongated portion and positioned near the bottom of said channel for receiving the pieces of good cane, said conveyor means continuing beneath the water level through an opening in said end portion and terminating at a point outside the channel and above the water level, and conveyor means in said curved end portion and extending to a point just below the surface of the water for removing material floating on said surface, the second mentioned conveyor means being disposed transversely to the first mentioned conveyor means, said end portion being adapted to block floating material from passing on to the first mentioned conveyor and being also so constructed and arranged as to compel said floating material to be carried on to the second mentioned conveyor by the water in said channel.

6. Apparatus for cleansing sugar cane prior to the extraction of juice therefrom, comprising an endless water channel for the reception of cut pieces of cane and trash, said channel having an elongated intermediate portion and a curved end portion, conveyor means extending in said elongated portion and positioned near the bottom of said channel for receiving the pieces of good cane, said conveyor means continuing beneath the water level through an opening in said end portion and terminating at a point outside the channel and above the water level, and conveyor means extending to a point just below the surface of the water for removing material floating on said surface, said end portion being adapted to block floating material from passing on to the first mentioned conveyor and being also so constructed and arranged as to compel said floating material to be carried on to the second mentioned conveyor by the water in said channel, and a sump extending beneath the first mentioned conveyor means and sloping downwardly and away therefrom.

RALPH SADLEIR FALKINER.